Dec. 31, 1963    W. TEDDER    3,115,675
EXTRUSION APPARATUS WITH DEGASIFICATION ELEMENTS
Filed April 30, 1962
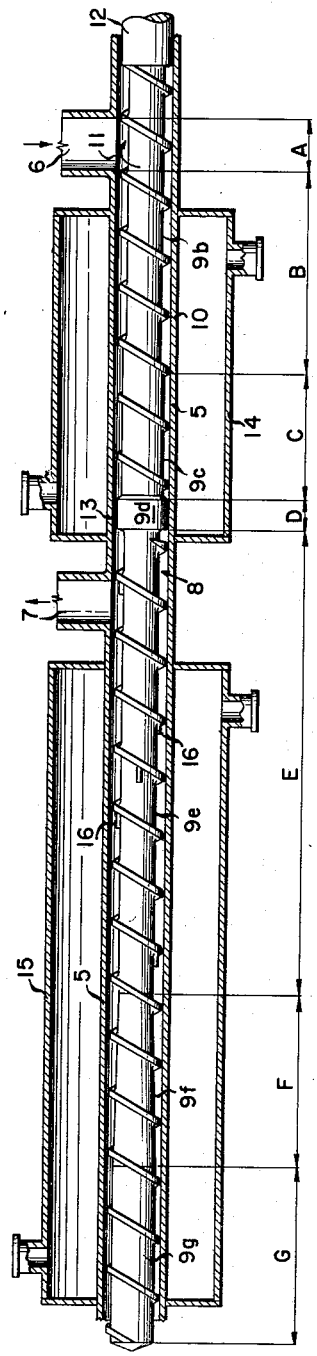
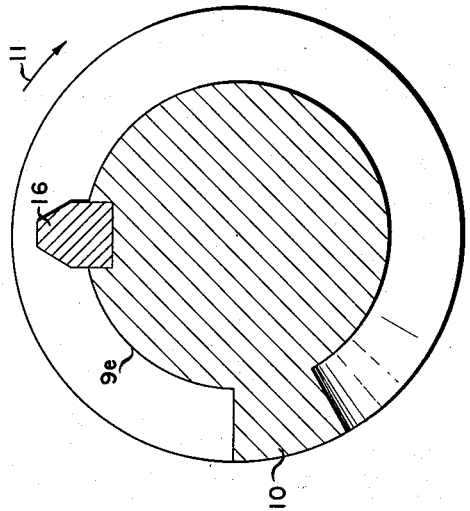
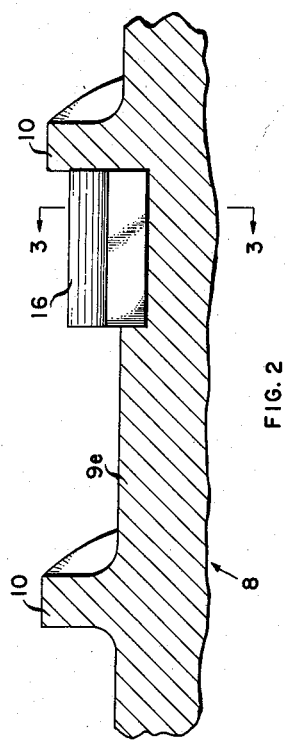
INVENTOR:
WOLDEMAR TEDDER
BY: Oswald H. Wilmore
HIS ATTORNEY

United States Patent Office 3,115,675
Patented Dec. 31, 1963

3,115,675
EXTRUSION APPARATUS WITH DEGASIFICATION ELEMENTS
Woldemar Tedder, The Hague, Netherlands, assignor to Shell Oil Company, New York, N.Y., a corporation of Delaware
Filed Apr. 30, 1962, Ser. No. 191,247
5 Claims. (Cl. 18—12)

The invention relates to a worm-screw for an extruder, and more particularly for an extruder which is fed with a material containing a liquid or volatiles and which has a zone in which the said material is allowed to give off the said volatiles in gaseous form.

A well-known embodiment of a screw of this type comprises, at least in one part thereof, a root with at least one helical rib extending around its circumference, the screw having in the said part a vent zone in which the dimensions of the rib and the root are such that the effective flight space between two successive threads of one and the same rib is greater than in a preceding zone. By effective flight space is understood that part of the flight space which is available for the material to be transported. In a screw of this type the material to be extruded will not entirely fill the said flight space in the vent zone but will leave a portion of it free. Since this free space can communicate with the atmosphere or with a vacuum space, it is possible to separate gases from the material in the free portion of the flight space and remove them from the said space.

With a screw made exclusively in the manner described it is possible in some cases to achieve satisfactory drying or degasification of the material for extrusion, for example if this material only contains volatiles incompatible with it, viz., not soluble therein. By way of example, it is stated that a screw of this type for the extrusion of water-containing polyolefins has been found suitable for drying polyolefins down to a residual water content of 0.02–0.1% of the total weight. Special provisions are necessary for the removal of volatiles compatible with the material to be extruded, for example monomers dissolved in polymers, from the said material to a sufficiently low percentage. These commonly known provisions are: high vacuum, long vent zone and a plurality of vent ports in the barrel surrounding the screw.

Although all these measures may be conducive to degasification, in many cases the latter is still unsatisfactory. For in the vent zone of the screw which is partially filled with material, the latter, having a behavior similar to that of a plastic mass, is in contact with the pushing face of the rib, the circumference of the root and the interior of the barrel surrounding the screw. When the screw is rotated the mass is moved forward, describing a rolling motion due to the force exerted by the pushing face of the rib and by friction with the barrel wall surrounding the screw, this mass assuming the shape of a helical roll. This motion of the mass leaves its interior practically undisturbed, with the results that volatiles present therein either cannot escape at all or only do so with difficulty.

The object of the invention is to improve the degasification of materials in a screw extruder by allowing not only one but all parts of the mass to give off gases to the surrounding atmosphere.

To this end, according to the invention degasification elements are provided at certain points in the vent zone in the flight between two adjacent threads of the screw close to the pushing face of a rib, the said elements being arranged to reduce but not totally obstruct the flight space in the adjacent region. These degasification elements may be designed in various ways, for example in the form of one or more cams, raised portions, projections, teeth, etc., placed on the root or on the pushing face of the rib, or so as to be in contact with both. The height of the element may vary from 20–100% of the rib height; the element normally occupies approximately 40% of the flight width but other values are not precluded. The elements may be of various shapes, for example rectangular, while in addition they may be provided with pins, teeth, sharp edges and the like in order to intensify the effect envisaged.

The properties of the material to be extruded of course greatly affect the design of the degasification element and the positioning thereof on the screw. The arrangement and dimensions of the elements are, however, such that even at points where the elements are positioned the remainder of the flight is not entirely filled with material but there is an unoccupied portion left over which communicates with the vent port of the barrel.

The invention is applicable to screws having single-start flights or multiple start flights, i.e., there may be one or more ribs in one or more sections of the screw.

The invention will now be illustrated with reference to the accompanying drawing forming a part of this specification and showing an exemplary construction of a screw according to the invention, viz., a screw for extruding a polymer containing a dissolved monomer, wherein:

FIGURE 1 is a longitudinal sectional view through a part of extruder, the screw being shown in elevation;

FIGURE 2 is an enlarged fragmentary longitudinal sectional view through the screw at the vent zone, showing the degasification element; and FIGURE 3 is a transverse sectional view through the screw, taken on the line 3—3 of FIGURE 2 but showing the screw in full section.

Referring to FIGURE 1, there is shown an extruder barrel 5 having a cylindrical bore, one or more feed ports 6 and one or more vent ports 7 and containing an extruder screw 8 mounted for rotation therein. The solid material admitted at 5 is discharged through the left part of the barrel through a suitable discharge device, not shown.

The screw 8 comprises a root $9b$–$9g$ and a helical rib 10. The screw is rotated in the direction of the arrow 11 by means of a stem 12 which extends out at the right end of the barrel. The ribs may have any suitable cross section, e.g., with flat outer faces as shown, which move with a very narrow clearance within the cylindrical bore of the barrel. The screw has, from right to left, the following zones:

Zone A, which is in open communication with the feed port 6.

Zone B, in which the root $9b$ of the screw is cylindrical.

Zone C, where the diameter of the cylindrical root $9c$ is larger than in zone B.

Zone D, where there is no rib around the root $9d$, and where the diameter of the root is only slightly less than the interior diameter of the barrel 5, to leave a narrow annular slit 13.

Zone E, in which the cylindrical root $9e$ is again provided with a helical rib but the flight space between two adjacent threads of the rib is larger in zone E than in zone C. In case the root $9e$ has been provided with a multi-start flight the effective flight space between two successive threads of one and the same rib in this zone must be greater than in the preceding zones A, B or C. This may be achieved in any of several ways, e.g., by making the diameter of the root $9e$ smaller than that of root $9c$, the rib than having the same pitch and thickness as in zone C; however, it is also possible to use a different pitch or a variable (non-uniform) pitch. In zone E the space between the ribs communicates with the vent ports 7, communicating with the atmosphere or connected with a vacuum space.

Zone F, in which the diameter of the root $9f$ gradually increases.

Zone G, with a large-diameter cylindrical root 9g.

Furthermore, as an aid to local temperature control, means have been provided around the barrel 4 to heat an/or cool the polymer, e.g., jackets 14 and 15 through which thermal fluid can be circulated.

The screw operates as follows:

In zone A polymer containing monomers is fed to the screw 8 via the port 6 in powder or granule form. By rotating the screw 8 with the aid of an electric motor and reduction gear, or by any other known means, the polymer in the barrel 5 is pushed forward. First zone B is traversed, where the polymer is heated by heat supplied through the wall of the barrel 4 from the jacket 14 and by mechanical energy due to compaction so as to become at the left end of zone B an entirely plastic mass; in zone C, i. e., the compression zone, this plastic mass is compacted.

As it passes zone D the mass is forced through the narrow annular slit 13 between large root 9d and barrel wall in order to reduce the throughput to the next zone E. This gives the mass a relatively large surface area, which is conducive to the escape of gases. Owing to the relatively large flight space between the threads in the vent zone E, the mass only partly fills the said space, more particularly that part of the space close to the pushing face of the rib. The effect of the rotating screw and the friction along the barrel wall on the mass impart to it the shape of a helical roll, next to which is the similarly helical, free portion of the flight space, which communicates with the vent port(s) 7. In this way degasification takes place over the entire length of zone E; since, however, the mass describes a substantially rolling motion as it moves forward in the barrel, if additional steps are not taken substantially the same parts of the mass, namely those on the outside of the helical roll, would continuously be in contact with the free space, while in the interior of the rolling mass the same parts would always remain enclosed.

To prevent this the invention provides degasification elements 16 which are positioned at certain points in the flight close to the pushing face of the rib. In the embodiment shown in the drawing these elements 16 are designed as rectangular plates fixed in longitudinal recesses in the screw root along their longer sides, which preferably are shorter than the axial distance between opposed rib faces, and abutting the pushing or leading face of the rib along their shorter sides, which preferably are shorter than the radial extent of the rib. However, as was indicated above, the invention is not restricted to this specific arrangement. The degasification elements, whether formed as plates as described or of other construction, are shaped to obstruct only a minor fraction of the flight space between adjoining ribs and advantageously extend circumferentially for only small distances, e.g., 5 to 20° of arc, as shown in FIGURE 3. Successive elements may be provided at intervals, e.g., greater than 90°, as appears in FIGURE 1.

The rolling mass of polymer moving through the helical flight space in the zone E is deflected or made to flow over and along the elements 16, so that the parts of the mass initially on the outside are mixed with those initially in the center of the said rolling mass. This results in more homogeneous degasification throughout the mass as a whole and in an increase in the aggregate amount of volatiles released from the mass. After degasification in zone E, the polymer, from which sufficient monomer has now been separated, passes to zone F where it is compressed. At the end of zone G, where any pulsations occurring in the motion of the mass are damped, the mass leaves the screw at the correct temperature and pressure through an extrusion die not shown.

Although the illustrative embodiment deals with a screw for polymer extrusion, the invention is also applicable to other screws which, as in the example given, are equipped with a vent zone, and for the purpose of extruding other materials containing volatiles which have to be removed.

I claim as my invention:

1. In an extrusion apparatus which comprises a barrel having a feed opening, an outlet and a vent port intermediate said opening and outlet, and an extrusion screw rotatable within said barrel, said screw comprising a central root and at least one helical rib extending outwardly from the root and providing threads for advancing material axially through the barrel, the said screw having at said vent port a vent zone whereat the effective flight space between two successive threads of one and the same rib is greater than the effective flight space between two successive threads of one and the same rib in a zone displaced from said vent zone toward the feed opening, the improvement of at least one degasification element fixed to said screw within said greater flight space of the vent zone close to the pushing face of a rib for locally obstructing a minor fraction of the said greater flight space.

2. An extrusion apparatus as defined in claim 1 wherein each said degasification element consists of a wall extending radially outward from the screw root.

3. An extrusion apparatus as defined in claim 1 wherein each said degasification element consists of a wall which abuts the said pushing face of the rib.

4. An extrusion apparatus as defined in claim 1 wherein said screw includes a plurality of degasification elements situated at circumferentially spaced intervals of said greater flight, each said element consisting of substantially rectangular plate having a long side positioned on the root and a short side extending radially outward close to said pushing side of the rib.

5. An extrusion apparatus as defined in claim 4 wherein said short side of each plate abuts said pushing face of the rib, said shorter side being shorter than the radial extent of the rib.

References Cited in the file of this patent

UNITED STATES PATENTS

| | | |
|---|---|---|
| 2,838,794 | Munger et al. | June 17, 1958 |
| 3,023,456 | Palfey | Mar. 6, 1962 |

FOREIGN PATENTS

| | | |
|---|---|---|
| 435,210 | Great Britain | Sept. 17, 1935 |